(12) United States Patent
Oita et al.

(10) Patent No.: US 7,639,298 B2
(45) Date of Patent: Dec. 29, 2009

(54) IMAGING DEVICE

(75) Inventors: Masaya Oita, Daito (JP); Hiromichi Tanaka, Daito (JP); Masafumi Kimata, Kusatsu (JP); Sumio Terakawa, Ibaraki (JP)

(73) Assignee: Funai Electric Co., Ltd., Daito-shi (JP)

( * ) Notice: Subject to any disclaimer, the term of this patent is extended or adjusted under 35 U.S.C. 154(b) by 582 days.

(21) Appl. No.: 11/637,666

(22) Filed: Dec. 13, 2006

(65) Prior Publication Data

US 2007/0131993 A1   Jun. 14, 2007

(30) Foreign Application Priority Data

Dec. 13, 2005   (JP) ............... 2005-358656

(51) Int. Cl.
*H04N 5/335* (2006.01)
(52) U.S. Cl. ...................... 348/308; 348/300
(58) Field of Classification Search ................ 348/300, 348/308, 226.1, 229.1, 362, 364; 257/290–293; 250/208.1–208.6
See application file for complete search history.

(56) References Cited

U.S. PATENT DOCUMENTS

| | | | |
|---|---|---|---|
| 5,539,461 A | | 7/1996 | Andoh et al. |
| 6,657,665 B1 * | | 12/2003 | Guidash ...................... 348/308 |
| 7,542,085 B2 * | | 6/2009 | Altice et al. ................ 348/296 |
| 2004/0069930 A1 * | | 4/2004 | Zarnowski et al. ........ 250/208.1 |
| 2005/0052554 A1 | | 3/2005 | Sakurai et al. |
| 2006/0001751 A1 | | 1/2006 | Abe et al. |
| 2006/0027843 A1 * | | 2/2006 | Ogura et al. ................ 257/291 |

FOREIGN PATENT DOCUMENTS

| | | |
|---|---|---|
| JP | 6-334920 A | 12/1994 |
| JP | 2000-165754 A | 6/2000 |
| JP | 2002-325204 A | 11/2002 |

OTHER PUBLICATIONS

Mori, et al. "1/4-Inch 2-Mpixel MOS Image Sensor with 1.75 Transistors/Pixel." IEEE Journal of Solid-State Circuits. Dec. 2004. 39:12; 2426-2430.*

* cited by examiner

*Primary Examiner*—Tuan Ho
*Assistant Examiner*—Don Nguyen
(74) *Attorney, Agent, or Firm*—Crowell & Moring LLP

(57) ABSTRACT

Adjacent pixels in a pixel circuit of an imaging device use a primary capacitance, an amplifying transistor, a reset switch and a selection switch in common. Each pixel has a photodiode and a transfer switch having first and second gates provided on the photodiode side and the primary capacitance side, respectively. In a pixel downsampling read mode, the first and second gate voltages of each pixel to be discarded are brought to high level, and thereafter the first and second gate voltages of each pixel to be read are brought to high level, to transfer charge generated in the photodiode of the pixel to be read to the primary capacitance and the photodiode in each pixel to be discarded. This enables reduction of the potential of the primary capacitance, and hence reduction of the pixel sensitivity than using only the primary capacitance to store charge transferred from the transfer switch.

3 Claims, 7 Drawing Sheets

IMAGING DEVICE

BACKGROUND OF THE INVENTION

1. Field of the Invention

The present invention relates to an imaging device with reduced occurrence of flicker.

2. Description of the Related Art

Various studies have been made for an imaging device, particularly for a method of reading signals therein. For example, Japanese Laid-open Patent Publication 2000-165754 discloses a signal reading method for the purpose of increasing dynamic range. FIG. 1 and FIG. 2 correspond to FIG. 12 and FIG. 13 of the Patent Publication, respectively, which are a diagram of a pixel circuit of the fourth example described therein, and a timing chart showing the operation of the pixel circuit. The purpose of this signal reading method is not to reduce the occurrence of flicker, but to increase dynamic range as described above. However, since this method can be applied to reduce the occurrence of flicker under the illumination of a fluorescent lamp, this method will be described below as an example of a prior art.

FIG. 1 is a circuit diagram of a pixel circuit in a CMOS (Complementary Metal Oxide Semiconductor) image sensor applied to the conventional imaging device which has two transfer switches, i.e. a first transfer switch (transfer transistor) MTX1 and a second transfer switch (transfer transistor) MTX2, for one pixel. The pixel circuit has a floating diffusion capacitance CFD1 between the first transfer switch MTX1 and the second transfer switch MTX2 as well as a floating diffusion capacitance CFD2 between the second transfer switch MTX2 and a source-follower amplifying transistor MSF. In FIG. 1, reference symbols PD, MRES and MSEL designate a photodiode, a reset switch (reset transistor) and a selection switch (selection transistor), respectively.

This pixel circuit is designed to be able to switch a capacitance to be connected to the gate of the amplifying transistor MSF, between either a parallel connection of the capacitances CFD1, CFD2 or only the capacitance CFD2, under the control of a signal of a gate voltage $\phi_{TX2}$ applied to the transfer switch MTX2 as shown in FIG. 2 which is a timing chart showing an operation of the conventional pixel circuit. In FIG. 1 and FIG. 2, other reference symbols $\phi_{RES}$, $\phi_{TX1}$ and $\phi_{SEL}$ designate gate voltages of the reset switch MRES, transfer switch MTX1 and selection switch MSEL, respectively, while reference symbol OUT designates an output voltage (output signal) from the pixel circuit. In FIG. 2, furthermore, other reference symbols $R_{(P)}$, $R_{(C)}$, $R_{R(C1, C2)}$, $R_{R(C2)}$, CT, $R_{S(C1, C2)}$ and $R_{S(C2)}$ designate a reset point of the pixel (photodiode) at which the photodiode PD starts charge accumulation, a reset period of the pixel, a reset level reading period of the capacitances CFD1+CFD2, a reset level reading period of the capacitance CFD2, a charge transfer period, a signal level reading period of the capacitances CFD1+CFD2 and a signal level reading period of the capacitance CFD2, respectively.

Photogenerated carriers accumulated in the photodiode PD are divided and transferred to the capacitances CFD1, CFD2, because the gate voltage $\phi_{TX1}$ of the first transfer switch MTX1 is brought to a high level when the gate voltage $\phi_{TX2}$ of the second transfer switch MTX2 is at a high level. Thereafter, the gate voltage $\phi_{TX1}$ of the first transfer switch MTX1 is brought to a low level so as to read a signal based on photogenerated carriers stored in the capacitances CFD1, CFD2. Assuming that the voltage applied at this time to the gate of the amplifying transistor MSF is $V_{FD2}$, and the amount of charge of the photogenerated carriers is $Q_{PD}$, the voltage $V_{FD2}$ can be expressed by:

$$V_{FD2}=Q_{PD}/(C_{FD1}+C_{FD2})$$

where $C_{FD1}$, and $C_{FD2}$ are values of the capacitances CFD1, CFD2.

Next, charge having been stored in the capacitance CFD1 is transferred to the capacitance CFD2, and thereafter the gate voltage $\phi_{TX2}$ of the second transfer switch MTX2 is brought to a low level, so as to read a signal based on the photogenerated carriers stored in the capacitance CFD2. A voltage $V_{FD2H}$ applied at this time to the gate of the amplifying transistor MSF can be expressed by:

$$V_{FD2H}=Q_{PD}/C_{FD2}.$$

A comparison between the voltages $V_{FD2}$ and $V_{FD2H}$ indicates that the former $V_{FD2}$ is lower than the latter $V_{FD2H}$ because of the capacitance value $C_{FD1}$ in the denominator, meaning that the former $V_{FD2}$ causes a lower sensitivity.

As will be described below, the occurrence of flicker can be reduced by selectively using the two voltages $V_{FD2}$, $V_{FD2H}$ depending on required sensitivity. In normal brightness mode where an image received by the imaging device (specifically, photodiode) is in a normal brightness range, flicker is unlikely to occur. In this normal brightness mode, the imaging device is likely to be able to normally operate (e.g. produce an accurate or high fidelity image) even if the photodiode has a normal or long charge accumulation time (e.g. longer than a half period of a commercial AC power supply) with a normal or high pixel sensitivity. Thus, in the normal brightness mode, the imaging device uses a signal based on the voltage $V_{FD2H}$ (higher than the voltage $V_{FD2}$), which is applied to the gate of the amplifying transistor MSF with only the capacitance CFD2 storing charge, so as to cause the pixel sensitivity to stay normal or high.

On the other hand, in high brightness mode where an image received by the imaging device is in a high brightness range, flicker is likely to occur. In this high brightness mode, the imaging device is unlikely to be able to normally operate if the photodiode has a normal or long charge accumulation time (e.g. longer than a half period of a commercial AC power supply) with a normal or high pixel sensitivity. Thus, in the high brightness mode, the imaging device uses a signal based on the voltage $V_{FD2}$ (lower than the voltage $V_{FD2H}$) applied to the gate of the amplifying transistor MSF with both capacitances CFD1, CFD2 dividedly storing charge, so as to cause a lower pixel sensitivity, thereby achieving reduction of occurrence of flicker even with the normal or long charge accumulation time.

However, the imaging device according to the Japanese Laid-open Patent Publication 2000-165754 as described above requires two capacitances CFD1, CFD2 together with two transfer switches MTX1, MTX2 for one pixel. This is a problem because it causes the circuit structure to be complicated, thereby increasing the manufacturing cost of the imaging device.

SUMMARY OF THE INVENTION

It is an object of the present invention to provide an imaging device with reduced occurrence of flicker that can change the pixel sensitivity with an inexpensive and simple circuit structure without adding special circuit elements.

According to the present invention, this object is achieved by an imaging device comprising: a pixel circuit comprising:

multiple pixels each having a photoelectric conversion unit and transfer means for transferring signal charges output from the photoelectric conversion units; capacitance means, for storing the signal charges transferred from the transfer means; signal amplifying means for amplifying and outputting signals corresponding to the signal charges stored in the capacitance means; reset means for resetting the signal charges stored in the capacitance means; and pixel selection means for selecting each pixel to read a signal from, wherein the imaging device has an all-pixel read mode for reading signals from all the pixels and a pixel downsampling read mode for reading signals of pixels by discarding signals of the other pixels.

Adjacent ones of the pixels use the capacitance means, the signal amplifying means, the reset means and the pixel selection means in common.

The transfer means in each pixel has a first gate provided on the photodiode side and a second gate provided on the capacitance means side.

In the pixel downsampling read mode, the voltage of the first gate and the voltage of the second gate in each of the pixels to be discarded are brought to a high level, and subsequently the voltage of the first gate and the voltage of the second gate in each of the pixels to read a signal from are brought to a high level, so as to transfer charge, which is generated in the photoelectric conversion unit in each of the pixels to read a signal from, to the capacitance means and the photoelectric conversion unit in each of the pixels to be discarded. In the pixel downsampling read mode, not only the capacitance means but also channel portions of the transfer means and the photoelectric conversion units of the pixels to be discarded are used as capacitances for storing the signal charges transferred from the transfer means to lower potential of the capacitance means as compared with the case of using only the capacitance means as a capacitance for storing signal charges from the transfer means, thereby reducing sensitivity of the pixels.

Thus, in the imaging device according to the present invention, adjacent ones of the pixels use the capacitance means, the signal amplifying means, the reset means and the pixel selection means in common, so that the imaging device can be simplified in structure and reduced in manufacturing cost. Furthermore, in the pixel downsampling read mode, not only the capacitance means and channel portions of the transfer means and the photoelectric conversion units in the pixels to be discarded are used as capacitances for storing signal charges transferred from the transfer means. Accordingly, it is possible to lower the potential of the capacitance means to reduce the sensitivity of the pixels, thereby reducing the occurrence of flicker as compared with the case of using only the capacitance means as a capacitance for storing signal charges transferred from the transfer means.

Preferably, in the pixel downsampling read mode, the voltage of the first gate and the voltage of the second gate in each of the pixels to be discarded are brought to a high level, and subsequently the voltage of the first gate and the voltage of the second gate in each of the pixels to read a signal from are brought to a high level. And thereafter, the voltage of the first gate alone of each of the pixels to read a signal from is brought to a low level first, and subsequently the voltage of the second gate thereof is brought to a low level, and thereafter gate voltage of the pixel selection means is brought to a high level so as to read the potential of the capacitance means.

In this imaging device, only the voltage of the first gate is brought to a low level first when transferring the charge, which is generated in the photoelectric conversion unit in each pixel to read a signal from, to the capacitance means and the photoelectric conversion unit in each pixel to be discarded. Thus, the charge can be prevented from being transferred back to the photoelectric conversion unit in the each pixel to read a signal from.

Further preferably, the pixel circuit is formed of a semiconductor, wherein a dopant having the same polarity as a dopant forming the capacitance means is doped in a portion of the semiconductor below the second gate of each transfer means. The imaging device further comprises brightness determination means for determining whether or not the brightness of an image received by the imaging device exceeds a predetermined threshold value which is set so that at the predetermined threshold value, a charge accumulation time of each photoelectric conversion unit is equal to or shorter than ½ period of a commercial power supply. The pixel downsampling read mode has: a normal brightness mode to drive the pixel circuit with a normal sensitivity setting if the brightness determination means determines that the brightness of an image received by the imaging device is equal to or lower than the threshold value; and a high brightness mode to drive the pixel circuit with a low sensitivity setting lower than the normal sensitivity setting if the brightness determination means determines that the brightness of the image received by the imaging device exceeds the threshold value. Furthermore, in the high brightness mode, the voltage of the first gate and the voltage of the second gate in each of the pixels to be discarded are brought to a high level, and subsequently the voltage of the first gate and the voltage of the second gate in each of the pixels to read a signal from are brought to a high level, so as to transfer charge, which is generated in the photoelectric conversion unit in each of the pixels to read a signal from, to the capacitance means and the photoelectric conversion unit in each of the pixels to be discarded. And thereafter, the voltage of the first gate alone of each of the pixels to read a signal from is brought to a low level first, and subsequently the voltage of the second gate thereof is brought to a low level, and thereafter gate voltage of the pixel selection means is brought to a high level so as to read the potential of the capacitance means.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

Each of FIG. 5A

Each of FIG. 6A

DESCRIPTION OF THE PREFERRED EMBODIMENTS

Figure 1:
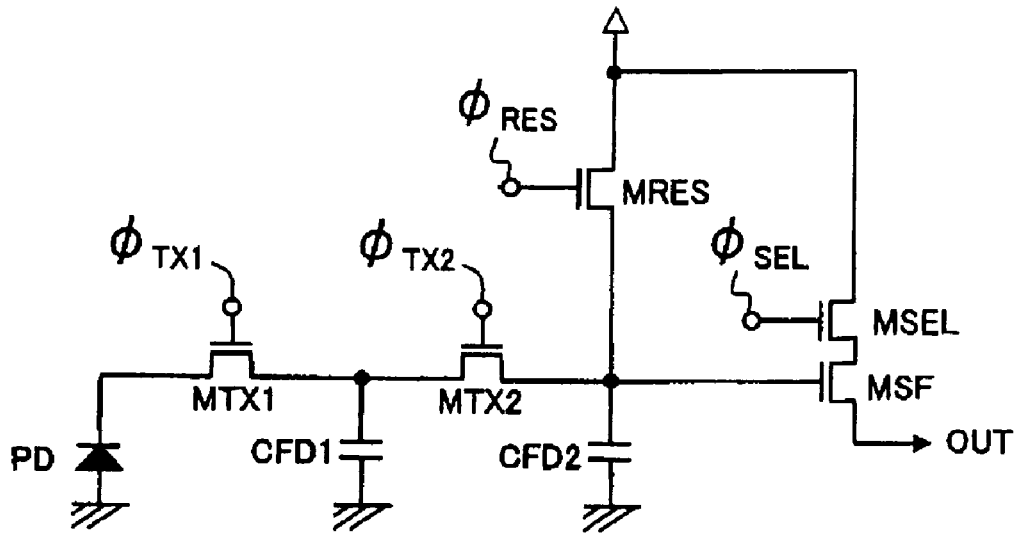
FIG. 1 is a circuit diagram of a pixel circuit applied to a conventional imaging device.
Figure 2:
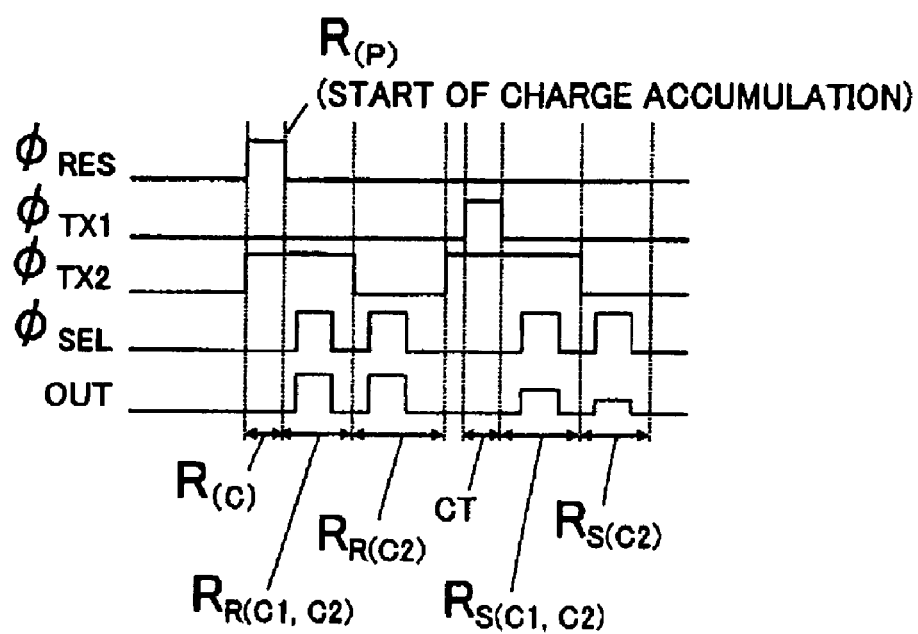
FIG. 2 is a timing chart showing an operation of the conventional pixel circuit.

Embodiments of the present invention, as best mode for carrying out the invention, will be described hereinafter with reference to the drawings. The present invention relates to an imaging device with reduced occurrence of flicker. It is to be understood that the embodiments described herein are not intended as limiting, or encompassing the entire scope of, the present invention. Note that like parts are designated by like reference numerals, characters or symbols throughout the drawings.

Figure 3:
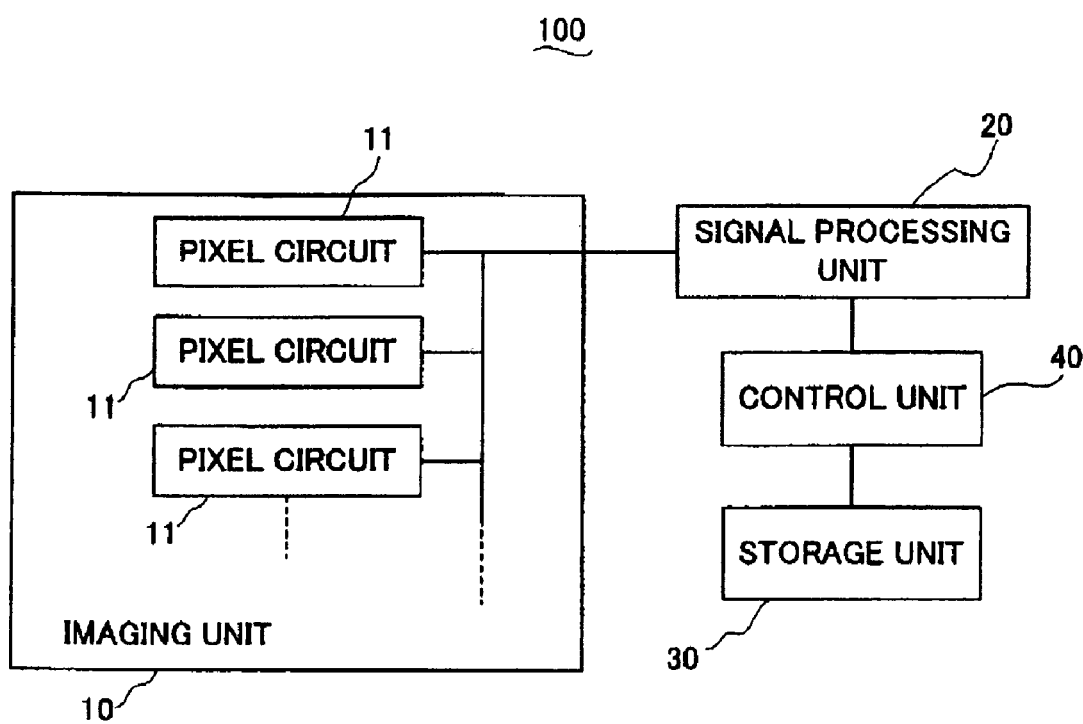
FIG. 3 is a schematic block diagram of an imaging device according to an embodiment of the present invention.

An embodiment of an imaging device according to the present invention will be described with reference to the annexed drawings. FIG. 3 is a schematic block diagram of an imaging device 100 according to the embodiment of the present invention. The imaging device 100 comprises: an imaging unit 10 having multiple pixels for imaging an image and outputting an electrical signal corresponding to the image; a signal processing unit 20 for processing the electrical signal output from the imaging unit 10; a storage unit 30 for storing electrical signals output from the signal processing unit 20; a control unit 40 for controlling respective units and elements of the imaging device 100; and so on. The imaging unit 10 has many pixel circuits 11.

In a general pixel circuit, various components are provided for each pixel, in which the various components include photodiodes, transfer switches, capacitances, amplifying transistors, reset switches and selection switches as will be described later. However, in the general pixel circuit, many components are required to be mounted in each pixel, making it difficult to reduce the size of the pixel circuit. Thus, according to the present embodiment, four adjacent pixels use various components in common, other than the photodiodes and the transfer switches, so as to reduce the size of each pixel, and hence the size of the pixel circuit.

Figure 4:
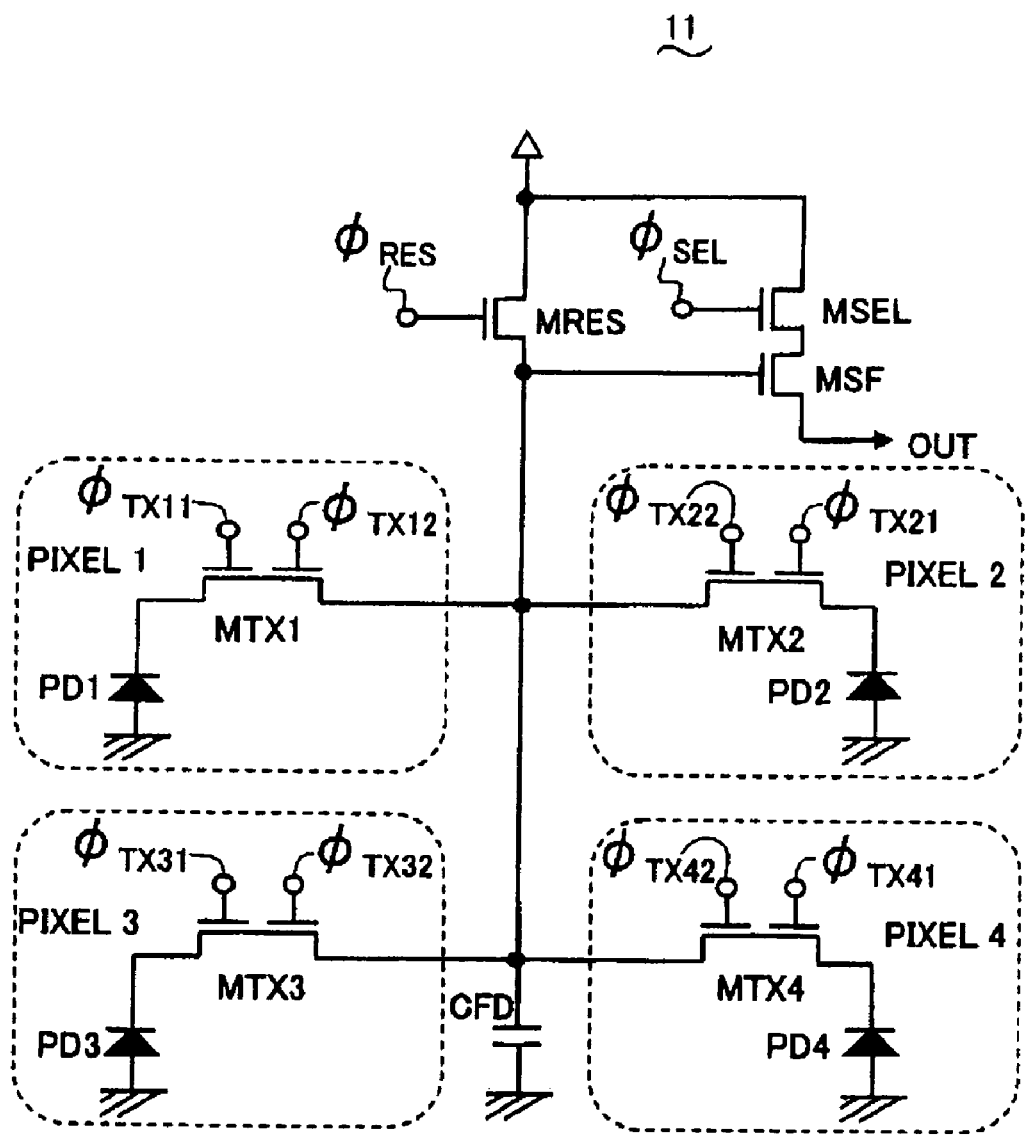
FIG. 4 is a schematic circuit diagram of an example of a pixel circuit applicable to an imaging device of the embodiment of the present invention.

FIG. 4 is a schematic circuit diagram of an example of a pixel circuit 11 applicable to an imaging device 100 of the present embodiment, and shows a combination of four pixel, pixel 1 to pixel 4, as an example of a unit of pixels among many pixels in the pixel circuit 11. Respectively for the pixels 1 to 4 (one of multiple units each of four pixels), the pixel circuit 11 has photodiodes (photoelectric conversion units) PD1, PD2, PD3, PD4 for converting light to electrical signals as well as transfer switches (transfer means) MTX1, MTX2, MTX3, MTX4 for transferring signal charges output from the photodiodes PD1, PD2, PD3, PD4.

In the pixel circuit 11 of FIG. 4, the four adjacent pixels, pixels 1 to 4 use in common: a floating diffusion capacitance (capacitance means) CFD for storing signal charges transferred from the transfer switches MTX1, MTX2, MTX3, MTX4; an amplifying transistor (signal amplifying means) MSF such as a source-following amplifying transistor for amplifying and outputting a signal corresponding to the signal charges stored in the capacitance CFD; a reset switch (reset means) MRES for resetting the signal charges stored in the capacitance CFD; and a selection switch (pixel selection means) MSEL for selecting pixels to read signals from.

Figure 5A:
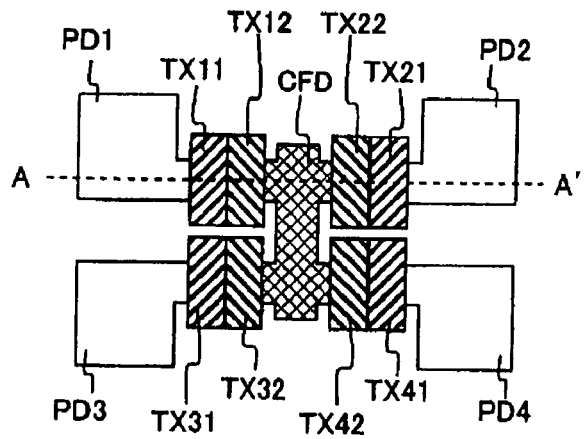
FIG. 5B is a schematic plan view of a semiconductor forming pixels 1, 2, 3, 4 and a capacitance CFD in the pixel circuit.
Figure 5B:
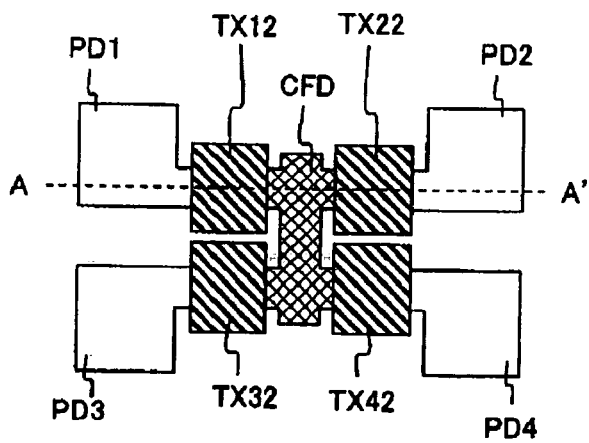
Figure 6A:
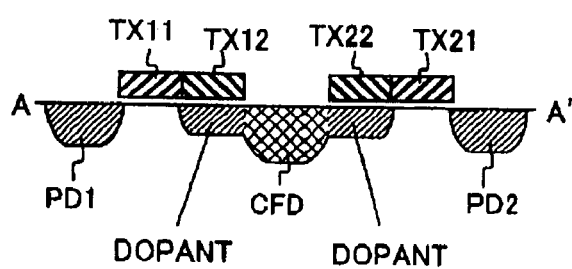
FIG. 6B is a schematic cross-sectional view along A-A' line of FIG. 5.
Figure 6B:
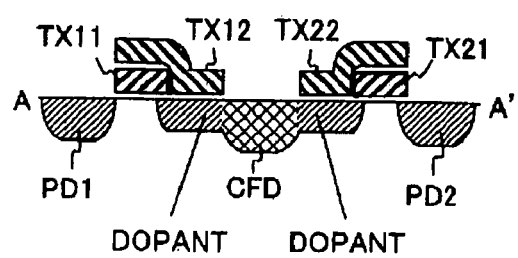

Each of FIG. 5A and FIG. 5B is a schematic plan view of a semiconductor (silicon) forming the pixels 1 to 4 and the capacitance CFD shown in FIG. 4, while each of FIG. 6A and FIG. 6B is a schematic cross-sectional view along A-A' line of each of FIG. 5A and FIG. 5B, respectively. Here, each of FIG. 5A and FIG. 6A shows a model in which a first gate TX1 and a second gate TX12 (likewise a first gate TX21 and a second gate TX22) are formed on the same plane, while each of FIG. 5B and FIG. 6B shows a model in which a second gate TX12 is stacked on an upper surface of a first gate TX11 (likewise a second gate TX22 is stacked on an upper surface of a first gate TX21). Although not shown in FIG. 6A and FIG. 6B, the same applies to the relationships between a first gate TX31 and a second gate TX32, and between a first gate TX41 and a second gate TX42. Either model makes it possible to manufacture equivalent semiconductors, but the model of FIG. 5B or FIG. 6B enables a manufacturing process to be easier and lower in cost. As also shown in FIG. 4, it can be said that each first gate is provided on the photodiode PD side, while each second gate is provided on the capacitance CFD side.

Note that the transfer switch MTX1 has a first gate TX11 and a second gate TX12, in which voltages to be applied to the respective gates are hereafter referred as to $\phi_{TX11}$ and $\phi_{TX12}$. Similarly, the transfer switch MTX2 has a first gate TX21 and a second gate TX22 with voltages $\phi_{TX21}$, $\phi_{TX22}$ applied to the respective gates, and the transfer switch MTX3 has a first gate TX31 and a second gate TX32 with voltages $\phi_{TX31}$, $\phi_{TX32}$ applied to the respective gates, while the transfer switch MTX4 has a first gate TX41 and a second gate TX42 with voltages $\phi_{TX41}$, $\phi_{TX42}$ applied to the respective gates.

In the transfer switches MTX1, MTX2, MTX3, MTX4 of the pixels 1, 2, 3, 4, the first gates TX11, TX21, TX31, TX41 are respectively provided close to the second gates TX12, TX22, TX32, TX42, in which, for example, one of the respective first and second gates is formed of a first layer of polysilicon while the other is formed of a second layer of polysilicon. Furthermore, as shown in each of FIG. 6A and FIG. 6B, a dopant (impurity) having the same polarity as a dopant forming the capacitance CFD is shallowly doped in a portion of the semiconductor below the second gates TX12, TX22 (and likewise below the second gates TX32, TX42).

Figure 7:
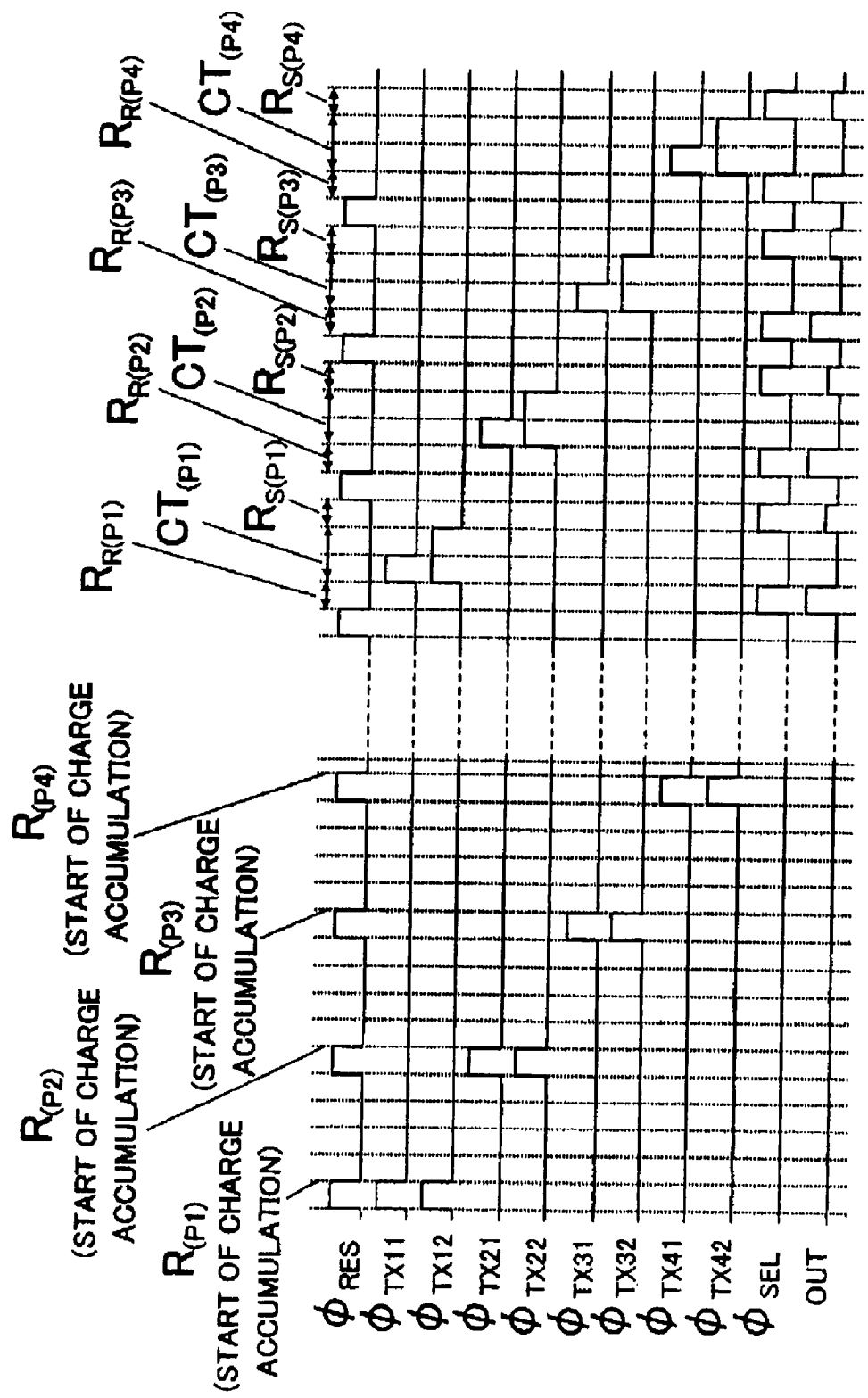
FIG. 7 is a timing chart showing an operation of the pixel circuit in all-pixel read mode.
Figure 8:
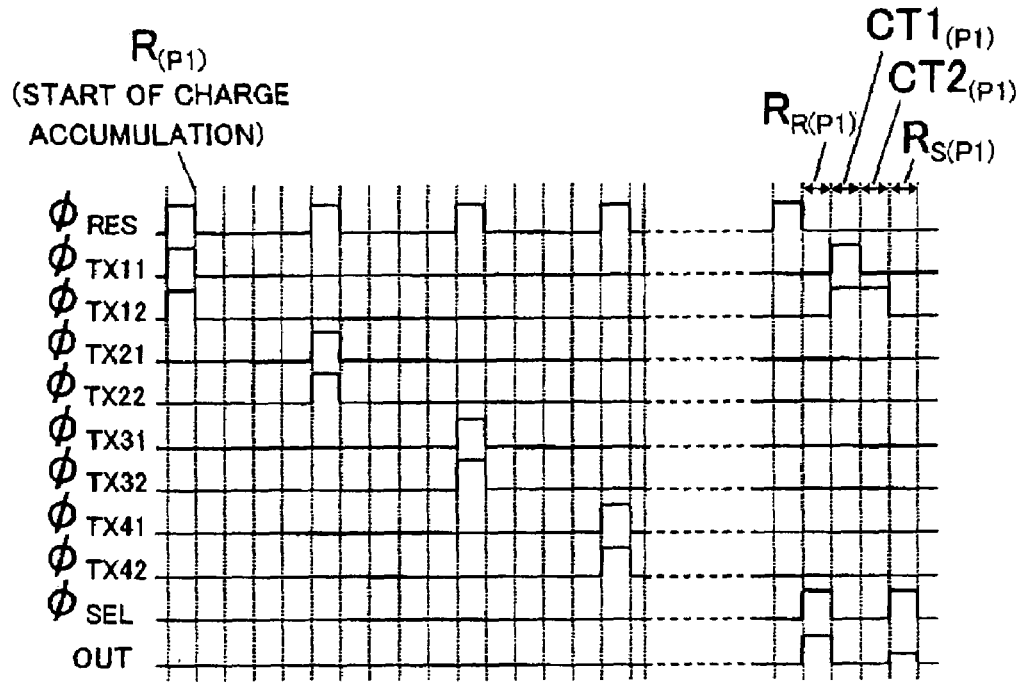
FIG. 8 is a timing chart showing an operation of the pixel circuit in normal brightness mode.
Figure 9:
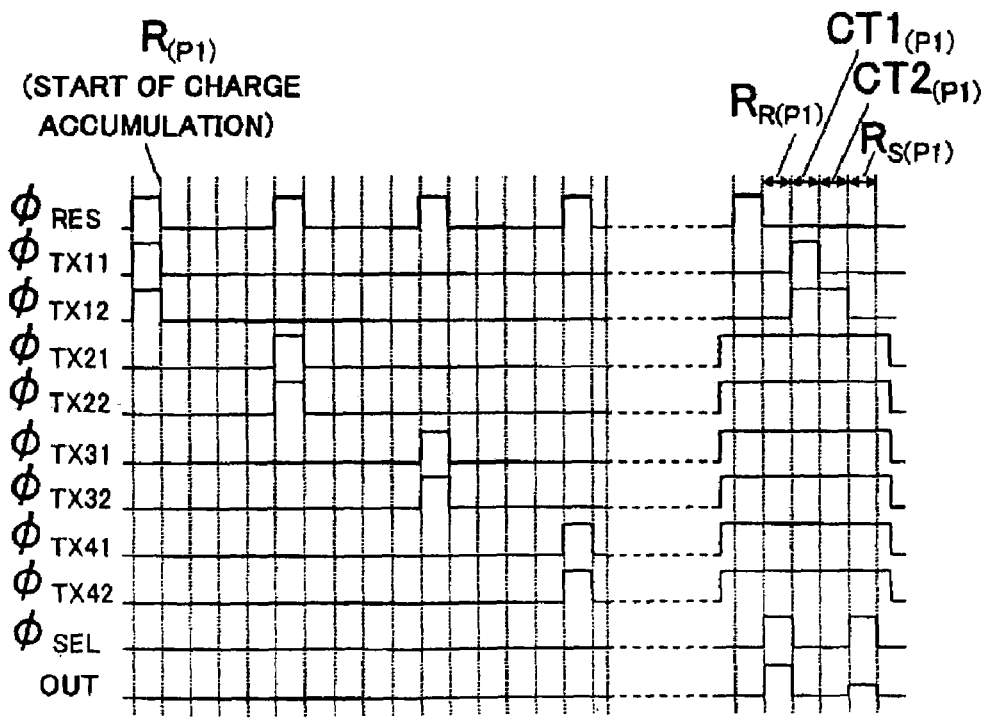
FIG. 9 is a timing chart showing an operation of the pixel circuit in high brightness mode.

The pixel circuit 11 has an all-pixel read mode to sequentially read signals of the pixels 1, 2, 3, 4 for capturing a still image as well as a pixel downsampling read mode to read either one of the pixels 1, 2, 3, 4 without reading the others (i.e. by discarding or decimating the others) for capturing moving images or for finder display. FIG. 7 to FIG. 9 are timing charts showing operations of the pixel circuit 11 of FIG. 4 in all-pixel read mode, normal brightness mode and high brightness mode, respectively.

In the all-pixel read mode, the pixel circuit 11 operates based on the timing chart shown in FIG. 7, in which: reference symbols $R_{(P1)}$, $R_{(P2)}$, $R_{(P3)}$, $R_{(P4)}$ respectively designate reset points of the pixels 1, 2, 3, 4 at which the photodiodes PD1, PD2, PD3, PD4 start charge accumulation, respectively; $R_{R(P1)}$, $R_{R(P2)}$, $R_{R(P3)}$, $R_{R(P4)}$ respectively designate reset level reading periods of the pixels 1, 2, 3, 4 in which the pixel circuit 11 reads reset levels of the pixels 1, 2, 3, 4 to read signals from; $CT_{(P1)}$, $CT_{(P2)}$, $CT_{(P3)}$, $CT_{(P4)}$ respectively designate charge transfer periods of the pixels 1, 2, 3, 4; and $R_{S(P1)}$, $R_{S(P2)}$, $R_{S(P3)}$, $R_{S(P4)}$ respectively designate signal level reading periods of pixels 1, 2, 3, 4 when the pixel circuit 11 reads signal levels of the pixels 1, 2, 3, 4. Furthermore, in FIG. 7, other reference symbols $\phi_{RES}$, $\phi_{TX11}$, $\phi_{TX12}$, $\phi_{TX21}$, $\phi_{TX22}$, $\phi_{TX31}$, $\phi_{TX32}$, $\phi_{TX41}$, $\phi_{TX42}$ and $\phi_{SEL}$ designate gate voltages of the reset switch MRES, transfer switches MTX1, MTX2, MTX3, MTX4 and selection switch MSEL, respectively, while the other reference symbol OUT designates an output voltage (output signal) from the pixel circuit 11.

Thus, in the all-pixel read mode as shown in FIG. 7, the pixel circuit 11 sequentially reads signals of the pixels 1, 2, 3, 4, so that the occurrence of flicker is not reduced thereby. However, actually, this is not considered to cause a problem because the all-pixel read mode is usually used e.g. for capturing a still image. That is, assuming that the pixel circuit 11 is applied e.g. to a digital still camera, it normally takes a long time to read signals from all pixels of a still image, so that generally the pixel circuit 11 is used, for example, along with an external shutter. In this case, the charge accumulation time is controlled by the external shutter, which does not cause the problem of flicker.

The following describes a method of reducing the occurrence of flicker in a pixel downsampling read mode in which pixels are skippingly read out. In this pixel downsampling read mode, each of the pixels 2 to 4 is skipped by using only each pixel 1 and discarding pixels 2 to 4. This skipping is performed because it is necessary to read signals at a high speed. The pixel downsampling read mode is performed in either normal brightness mode or high brightness mode depending on the brightness of an image received by the imaging device 100 (specifically, each photodiode). The control unit 40 selects or switches the brightness mode of the pixel circuit 11 alternatively between the two brightness modes in the manner described below, and drives the pixel circuit 11 in the selected one of the brightness modes.

The signal processing unit (brightness determination means) 20 determines whether or not the brightness of an image received by the imaging device 100 exceeds a predetermined threshold value, so as to determine whether to drive the pixel circuit in the high brightness mode or the normal brightness mode. The imaging device 100 can also be designed to separately provide, in the imaging unit 10, a logic circuit for determining the brightness of the received image. Here, the predetermined threshold value is set so that at the predetermined threshold value of brightness, the charge accumulation time of each photodiode PD1, PD2, PD3, PD4 is equal to or shorter than ½ (half) period of the commercial AC power supply (which is a lighting period of a fluorescent lighting equipment). In the normal brightness mode, the pixel circuit 11 is driven with a normal sensitivity setting, while in the high brightness mode, the pixel circuit is driven with a low sensitivity setting lower than in the normal brightness mode.

First, a method of driving the pixel circuit 11 of FIG. 4 in the normal brightness mode, which is unlikely to cause flicker to occur without lowering the sensitivity of the pixels (hence of the pixel circuit 11), will be described with reference to FIG. 8. FIG. 8 is a timing chart showing an operation in the normal brightness mode of the pixel circuit 11, in which: reference symbol $R_{R(P1)}$ designates a reset point of the pixel 1 at which the photodiode PD1 starts charge accumulation; $R_{R(P1)}$ designates a reset level reading period of the pixel 1 in which the pixel circuit 11 reads a reset level of the pixel 1 to read a signal from; $CT1_{(P1)}$ and $CT2_{(P1)}$ respectively designate a first charge transfer period and a second charge transfer period of the pixel 1; and $R_{S(P1)}$ designates a signal level reading period of the pixel 1 when the pixel circuit 11 reads a signal level of the pixel 1. Further, in FIG. 8, other reference symbols $\phi_{RES}$, $\phi_{TX11}$, $\phi_{TX12}$, $\phi_{TX21}$, $\phi_{TX22}$, $\phi_{TX31}$, $\phi_{TX32}$, $\phi_{TX41}$, $\phi_{TX42}$ and $\phi_{SEL}$ designate gate voltages of the reset switch MRES, transfer switches MTX1, MTX2, MTX3, MTX4 and selection switch MSEL, respectively, while the other reference symbol OUT designates an output voltage (output signal) from the pixel circuit 11.

When the pixel circuit 11 is driven in the normal brightness mode based on the timing chart of FIG. 8, charge having been stored in the photodiode PD1 is transferred only to the capacitance CFD by the transfer switch MTX1, because the gate voltages $\phi_{TX21}$, $\phi_{TX22}$, $\phi_{TX31}$, $\phi_{TX32}$, $\phi_{TX41}$, $\phi_{TX42}$ of the transfer switches MTX2, MTX3, MTX4 at the time of the reading are maintained at a low level. Assuming that the voltage applied at this time to the gate of the amplifying transistor MSF is $V_{FDH}$, and the amount of charge of the photogenerated carriers stored in the photodiode. PD1 is $Q_{PD1}$, the voltage $V_{FDH}$ can be expressed by:

$$V_{FDH}=Q_{PD1}/C_{FD}$$

where $C_{FD}$ is a value of the capacitance CFD. As compared with a voltage applied to the gate of the amplifying transistor MSF in the high brightness mode (which is voltage $V_{FD}$ described later), the voltage $V_{FDH}$ is maintained high, so that the sensitivity of the pixel 1 (hence of the pixel circuit 11) is maintained high.

Figure 10:
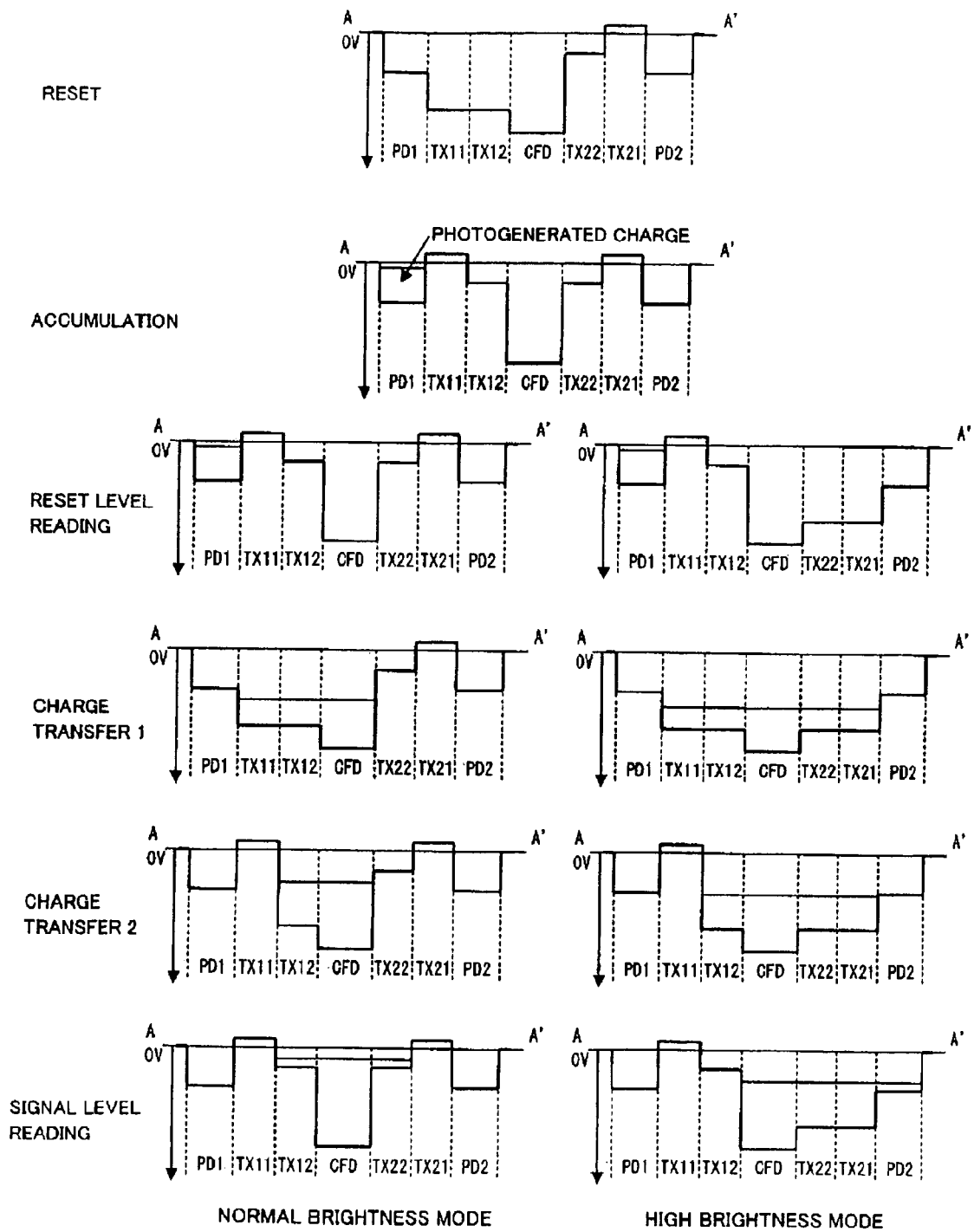
FIG. 10 is a chart showing distributions and variations of potential energies of seven components on the surface of a semiconductor in pixels 1, 2 in a downsampling read mode, the seven components being a photodiode PD1, gates TX11, TX12 of a transfer switch MTX1, a capacitance CFD, gates TX22, TX21 of a transfer switch MTX2, and a photodiode PD2.

FIG. 10 is a chart showing distributions and variations of potential energies of seven components on the surface of the silicon (semiconductor) in the pixels 1, 2 in the downsampling read mode, in which the seven components are the photodiode PD1, gates TX11, TX12 of the transfer switch MTX1, capacitance CFD, gates TX22, TX21 of the transfer switch MTX2, and photodiode PD2. Since the transfer switches MTX3, MTX4 are similar to the transfer switch MTX2 with respect to the corresponding distributions and variations of potential energies, they are omitted from the drawing. In the lower four of the six rows of graphs of FIG. 10, the left four graphs show the distributions and variations of the potential energies in normal brightness mode, while the right four graphs show those in high brightness mode.

Referring to FIG. 8 and FIG. 10, the operation of the pixel circuit 11 in the normal brightness mode will be described in detail below. As shown in the graph (RESET) in the uppermost row of FIG. 10 and in the upper three of the eleven rows of voltages of FIG. 8, both gate voltages $\phi_{TX11}$, $\phi_{TX12}$ of the first and second gates TX11, TX12 in the transfer switch MTX1 of the pixel 1 are brought to a high level, whereby charge having been stored in the PD1 is reset by the reset transistor MRES via the capacitance CFD. When both gate voltages $\phi_{TX11}$, $\phi_{TX12}$ are brought to a low level thereafter, the photodiode PD1 starts accumulation of photogenerated charge. In order to perform correlated double sampling for noise reduction after the charge accumulation time elapses, the capacitance CFD is reset with both gate voltages $\phi_{TX11}$, $\phi_{TX12}$ being maintained at the low level, and then the gate voltage $\phi_{SEL}$ of the selection switch MSEL is brought to a high level to read the reset level. The potential energies of the seven components at this time are shown in the left graph (RESET LEVEL READING) in the third of the six rows of graphs in FIG. 10. This graph (RESET LEVL READING) shows that the surface of the silicon below the second gates TX12, TX22 of the transfer switches MTX1, MTX2 of the pixels 1, 2 are lower in potential energy than the surface of the silicon below the first gates TX11, TX21. This is because of the impurity doping in a portion of the semiconductor below the gates TX12, TX22.

Next, both gate voltages $\phi_{TX11}$, $\phi_{TX12}$ are brought to a high level, and the photogenerated charge is transferred from the photodiode PD1 to the capacitance CFD as shown in FIG. 8 and in the left graph (CHARGE TRANSFER 1) in the fourth of the six rows of graphs in FIG. 10. Thereafter, as shown in FIG. 8 and in the left graph (CHARGE TRANSFER 2) in the fifth of the six rows of graphs in FIG. 10, the gate voltage $\Phi_{TX11}$ alone is brought to a low level. Subsequently, as shown in FIG. 8 and in the left graph (SIGNAL LEVEL READING) in the lowermost row of FIG. 10, the gate voltage $\phi_{TX12}$ is brought to a low level to transfer the photogenerated charge either to only the capacitance CFD or to the capacitance CFD and the portions of the silicon below the gates TX12, TX22, TX32, TX42 if the amount of the charge is large, so as to thereafter read the potential of the capacitance CFD or the signal level of the pixel 1. At this time, the height of the stored charge in the capacitance CFD shown in the left graph (SIGNAL LEVEL READING) in the lowermost row of FIG. 10 corresponds to the signal level (signal voltage) which serves as a gate input voltage of the amplifying transistor MSF, indicating that the sensitivity of the pixel circuit 11 here (pixel 1) is maintained high. Note that the signals of the pixels 2, 3, 4 are not read (discarded) because of the pixel downsampling read mode.

Next, a method of driving the pixel circuit 11 of FIG. 4 in the high brightness mode will be described with reference to FIG. 9. Generally, in the high brightness mode, flicker is likely to occur, and an imaging device is unlikely to be able to normally operate if each photodiode has a long charge accumulation time longer than the threshold value which is e.g. a half period of the commercial AC power supply. The operation of the pixel circuit 11 using the method here solves this problem by reducing the sensitivity of the pixel circuit 11 with a simple structure. FIG. 9 is a timing chart showing an operation in the high brightness mode of the pixel circuit 11, in which all the reference symbols correspond to those in FIG. 8.

Based on the timing chart of FIG. 9, the pixel circuit 11 is driven in the high brightness mode, whereby the sensitivity of each pixel 1 (and hence of the pixel circuit 11) is lowered in the following manner. Since the gate voltages $\phi_{TX21}$, $\phi_{TX22}$, $\phi_{TX31}$, $\phi_{TX32}$, $\phi_{TX41}$, $\phi_{TX42}$ of the transfer switches MTX2, MTX3, MTX4 at the time of the reading are at a high level as shown in FIG. 9, charge having been stored in the photodiode PD1 is divided and transferred by the transfer switch MTX1 to the capacitance CFD and the photodiodes PD2, PD3, PD4.

Assuming that the voltage applied at this time to the gate of the amplifying transistor MSF is $V_{FD}$, and the capacitance values of the photodiodes PD2, PD3, PD4 are $C_{PD2}$, $C_{PD3}$, $C_{PD4}$, the voltage $V_{FD}$ can be expressed by:

$$V_{FD} = Q_{PD1}/(C_{FD} + C_{PD2} + C_{PD3} + C_{PD4})$$

where $Q_{PD1}$ is the amount of charge stored in the photodiode PD1, and $C_{FD}$ is a value of the capacitance CFD. This indicates that the value of the voltage $V_{FD}$ can be lowered (as compared with the voltage $V_{FDH}$) without reducing the charge accumulation time, so that the sensitivity of the pixel circuit 11 is reduced, whereby it becomes possible for the pixel circuit 11 to reduce the occurrence of flicker.

Referring to FIG. 9 and FIG. 10, the operation of the pixel circuit 11 in the high brightness mode will be described in detail below. The operations of charge resetting and charge accumulation are similar to those in the normal brightness mode, except that in the high brightness mode, the gate voltages $\phi_{TX21}$, $\phi_{TX22}$, $\phi_{TX31}$ $\phi_{TX32}$, $\Phi_{TX41}$, $\Phi_{TX42}$ of the transfer switches MTX2, MTX3, MTX4 are brought to a high level before the resetting for the reset level reading as shown in the timing chart of FIG. 9.

In order to perform correlated double sampling for noise reduction after the charge accumulation time elapses, the gate voltage $\phi_{RES}$ of the reset switch MRES is brought to a high level while both of the gate voltages $\phi_{TX11}$, $\phi_{TX12}$ are maintained at the low level so as to reset the capacitance CFD and the photodiodes PD2, PD3, PD4. Next, the gate voltage $\phi_{RES}$ is brought to a low level, and thereafter the gate voltage $\phi_{SEL}$ of the selection switch MSEL is brought to a high level to read the reset level. The potential energies of the seven components at this time are shown in the right graph (RESET LEVEL READING) in the third of the six rows of graphs in FIG. 10. Since the gates voltage $\phi_{TX11}$, $\phi_{TX12}$ are at the low level while the gate voltages $\phi_{TX21}$, $\phi_{TX22}$ are at the high level, charge having been stored in the photodiode PD2 is reset and read via the capacitance CFD.

Next, as shown in the timing chart of FIG. 9, the gate voltage $\phi_{SEL}$ is brought to a low level, and then both gate voltages $\phi_{TX11}$, $\phi_{TX12}$ are brought to a high level to transfer the photogenerated charge from the photodiode PD1 to the capacitance CFD and the portions of the silicon below the gates of the transfer switches MTX2, MTX3, MTX4 of the pixels 2, 3, 4 as shown in the timing chart of FIG. 9 and the right graph (CHARGE TRANSFER 1) in the fourth of the six rows of graphs shown in FIG. 10.

Subsequently, as shown in FIG. 9 and in the right graph (CHARGE TRANSFER 2) in the fifth of the six rows of graphs in FIG. 10, the gate voltage $\phi_{TX11}$, alone is brought to a low level. Thereafter, the gate voltage $\phi_{TX12}$ is brought to a low level, and the photogenerated charge is transferred to the capacitance CFD and the portions of the silicon below the gates TX21, TX22, TX31, TX32, TX41, TX42 as well as to the photodiodes PD2, PD3, PD4 as shown in the right graph (SIGNAL LEVEL READING) in the lowermost row of FIG. 10. Subsequently, the gate voltage $\phi_{SEL}$ is brought to a high level to thereafter read the potential of the capacitance CFD or the signal level of the pixel 1.

Here, if both gate voltages $\phi_{TX11}$, $\phi_{TX12}$ were brought to a low level simultaneously, the charge having been transferred to the capacitance CFD would be transferred to the photodiode PD2 and at the same time back to the photodiode PD1. This is why the gate voltage $\Phi_{TX11}$ is brought to a low level first so as to prevent the photogenerated charge having been transferred from being transferred back to the photodiode PD1.

The height of the stored charge in the capacitance CFD shown in the right graph (SIGNAL LEVEL READING) in the lowermost row of FIG. 10 corresponds to the signal level (signal voltage) which serves as a gate input voltage of the amplifying transistor MSF, indicating that this height is lower than the height of the charge shown in the left graph (SIGNAL LEVEL READING) in the lowermost row of FIG. 10, i.e. that the sensitivity of the pixel circuit 11 here (pixel 1) is reduced.

Note that the pixel circuit 11 according to FIG. 4, FIG. 5A, and FIG. 5B has three photodiodes PD2, PD3, PD4, which can be used as capacitances, and FIG. 9 shows the case of using all the three photodiodes PD2, PD3, PD4. However, it is not the only way. For example, the pixel circuit 11 can similarly operate even in the case of using two photodiodes PD2, PD3 as capacitances, or in the case of using one photodiode PD2 as a capacitance. By varying the number of such photodiodes used as capacitances according to the brightness of an image received by the imaging device 100, it becomes possible to achieve a finer change in the sensitivity of the pixels or pixel circuit 11. Note further that although the present embodiment has described a method of reading signal of each pixel 1, it is needless to say that a signal of each pixel 2, each pixel 3 or each pixel 4 can be similarly read by exchanging the combination of the gate voltages $\phi_{TX11}$, $\phi_{TX12}$ of the transfer switch MTX1 and one of the three combinations: combination of the gate voltages $\phi_{TX21}$, $\phi_{TX22}$ of the transfer switch MTX2; combination of the gate voltages $\phi_{TX31}$, $\phi_{TX32}$ of the transfer switch MTX3; and combination of the gate voltages $\phi_{TX41}$, $\phi_{TX42}$ of the transfer switch MTX4.

As described in the foregoing, in the imaging device 100 according to the present embodiment, adjacent pixels use a floating diffusion capacitance CFD, an amplifying transistor MSF, a reset switch MRES and a selection switch MSEL in common, so that the imaging device 100 can be simplified in structure to reduce each pixel size and can be reduced in manufacturing cost. Further, in high brightness mode, not only the capacitance CFD, but also the photodiodes in the pixels removed or discarded by downsampling as well as portions on the silicon (channel portions) below the gates of the transfer switches are used as capacitances for storing photogenerated charge. Accordingly, it is possible to reduce the charge stored in the capacitance CFD to reduce the sensitivity of the pixels and hence of the pixel circuit, thereby reducing the occurrence of flicker as compared with the case of using only the capacitance CFD as a capacitance for storing signal charges transferred from the transfer switches.

In addition, by appropriately controlling the first gate voltage and second gate voltage of each pixel, it is possible for the pixel circuit 11 to perform: reset of the capacitance CFD and photodiodes in the pixels to be removed or discarded by downsampling; reset level reading of the pixels to be read; transfer of charge photogenerated in each photodiode to read a signal from; and reading of charge stored in the capacitance CFD. Accordingly, the sensitivity of the pixels and hence of the pixel circuit 11 can be reduced so as to be adapted to the brightness of an image received by the pixel circuit 11 without requiring addition of a new structure, whereby the reduction of occurrence of flicker with a simple and compact structure can be achieved.

Furthermore, when the charge photogenerated in a photodiode PD in a pixel to read a signal from is transferred to the capacitance CFD and a photodiode PD to be removed or discarded, the first gate voltage along is brought to a high level first. This prevents charge (stored in the CFD) from being transferred back to the photodiode PD in the pixel to read a signal from. In addition, the gate section of each transfer switch MTX is divided to first and second gates which are provided close to each other, in which a dopant having the same polarity as a dopant forming the capacitance CFD is doped in a portion of the semiconductor (silicon) below the second gate. Accordingly, between the first and second gates, driving waveforms and doping profiles of impurities (dopants) below the gates can be varied, making it possible to completely transfer the charge from the photodiode PD to the capacitance CFD (and each photodiode PD in each pixel to be discarded and each channel portion of each transfer switch).

It is to be noted that the imaging device according to the present invention is not limited to the imaging device 100 according to the present embodiment, and can be modified only if adjacent pixels use an amplifying transistor MSF, a reset switch MRES and a selection switch MSEL in common, and if each pixel has a transfer switch MTX with first and second gates, and further if not only each capacitance CFD but also photodiodes PDs and channel portions of the transfer switches in pixels to be discarded in downsampling are used as capacitances for storing signal charges transferred from the transfer switches.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2005-358656 filed Dec. 13, 2005, the content of which is hereby incorporated by reference.

What is claimed is:

1. An imaging device comprising:
a pixel circuit comprising: multiple pixels each having a photoelectric conversion unit and transfer means for transferring signal charges output from the photoelectric conversion units; capacitance means for storing the signal charges transferred from the transfer means; signal amplifying means for amplifying and outputting signals corresponding to the signal charges stored in the capacitance means; reset means for resetting the signal charges stored in the capacitance means; and pixel selection means for selecting each pixel to read a signal from,
wherein the imaging device has an all-pixel read mode for reading signals from all the pixels and a pixel downsampling read mode for reading signals of pixels by discarding signals of the other pixels,
wherein adjacent ones of the pixels use the capacitance means, the signal amplifying means, the reset means and the pixel selection means in common,
wherein the transfer means in each pixel has a first gate provided on the photodiode side and a second gate provided on the capacitance means side,
wherein in the pixel downsampling read mode, the voltage of the first gate and the voltage of the second gate in each of the pixels to be discarded are brought to a high level, and subsequently the voltage of the first gate and the voltage of the second gate in each of the pixels to read a signal from are brought to a high level, so as to transfer charge, which is generated in the photoelectric conversion unit in each of the pixels to read a signal from, to the capacitance means and the photoelectric conversion unit in each of the pixels to be discarded, and
wherein in the pixel down sampling read mode, not only the capacitance means but also channel portions of the transfer means and the photoelectric conversion units of the pixels to be discarded are used as capacitances for storing the signal charges transferred from the transfer means so as to lower potential of the capacitance means as compared with the case of using only the capacitance means as a capacitance for storing signal charges transferred from the transfer means, thereby reducing sensitivity of the pixels.

2. The imaging device according to claim 1,
wherein in the pixel downsampling read mode, the voltage of the first gate and the voltage of the second gate in each of the pixels to be discarded are brought to a high level, and subsequently the voltage of the first gate and the voltage of the second gate in each of the pixels to read a signal from are brought to a high level, and
thereafter the voltage of the first gate alone of each of the pixels to read a signal from is brought to a low level first, and subsequently the voltage of the second gate thereof is brought to a low level, and thereafter gate voltage of the pixel selection means is brought to a high level so as to read the potential of the capacitance means.

3. The imaging device according to claim 2,
wherein the pixel circuit is formed of a semiconductor,
wherein a dopant having the same polarity as a dopant forming the capacitance means is doped in a portion of the semiconductor below the second gate of each transfer means, wherein the imaging device further comprises brightness determination means for determining whether or not the brightness of an image received by the imaging device exceeds a predetermined threshold value which is set so that at the predetermined threshold value, a charge accumulation time of each photoelectric conversion unit is equal to or shorter than ½ period of a commercial power supply, wherein the pixel downsampling read mode has: a normal brightness mode to drive the pixel circuit with a normal sensitivity setting if the brightness determination means determines that the brightness of an image received by the imaging device is equal to or lower than the threshold value; and a high brightness mode to drive the pixel circuit with a low sensitivity setting lower than the normal sensitivity setting if the brightness determination means determines that the brightness of the image received by the imaging device exceeds the threshold value, and wherein in the high brightness mode, the voltage of the first gate and the voltage of the second gate in each of the pixels to be discarded are brought to a high level, and subsequently the voltage of the first gate and the voltage of the second gate in each of the pixels to read a signal from are brought to a high level, so as to transfer charge, which is generated in the photoelectric conversion unit in each of the pixels to read a signal from, to the capacitance means and the photoelectric conversion unit in each of the pixels to be discarded, and thereafter the voltage of the first gate alone of each of the pixels to read a signal from is brought to a low level first, and subsequently the voltage of the second gate thereof is brought to a low level, and thereafter gate voltage of the pixel selection means is brought to a high level so as to read the potential of the capacitance means.

* * * * *

UNITED STATES PATENT AND TRADEMARK OFFICE
CERTIFICATE OF CORRECTION

PATENT NO.       : 7,639,298 B2                              Page 1 of 1
APPLICATION NO. : 11/637666
DATED            : December 29, 2009
INVENTOR(S)      : Oita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 598 days.

Signed and Sealed this

Twenty-first Day of December, 2010

David J. Kappos
*Director of the United States Patent and Trademark Office*